Fig_10

Fig_3

Fig_4

INVENTORS.
Clarence R. Steele
Norval F. Allen
BY
ATTORNEYS

Fig_13

Fig_14

United States Patent Office 3,425,561
Patented Feb. 4, 1969

3,425,561
CENTRIFUGAL BASKET ASSEMBLY AND
METHOD OF MAKING SAME
Clarence R. Steele, Denver, and Norval F. Allen, Wheat
Ridge, Colo., assignors, by mesne assignments, to
American Factors Associates, Limited, Honolulu, Hawaii, a corporation of Delaware
Continuation of application Ser. No. 359,979, Apr. 15,
1964. This application Nov. 13, 1967, Ser. No. 682,682
U.S. Cl. 210—380        10 Claims
Int. Cl. B01d 33/06

ABSTRACT OF THE DISCLOSURE

Basket assembly and method of forming same for centrifugal separators including spaced wider and narrower annular end members and ribs in circumferentially spaced intervals between end members fixedly connected thereto as by welding. Flat wire of oblong section wound in coil formed of series of helical loops progressing continuously from a narrower loop to wider loop. End portions of coil fixedly connected to annular end members and each loop being fixedly connected at each point of contact to each rib to hold each loop in equidistant spaced relationship with adjoining loops. Ratio of thickness of loop to spacing between loops substantially greater than one to one. Support rings in contacting relation on exterior of ribs at spaced intervals between end members. Screening media supported by and in covering relation to inner surface of wire coil.

---

This application is a continuation of application Ser. No. 359,979, filed Apr. 15, 1964 for Centrifugal Basket and Method of Manufacture Thereof, and now abandoned.

This invention relates to continuous centrifugal apparatus and particularly to baskets for centrifugal apparatus and to the methods for preparation of such baskets.

Centrifugals or centrifuge machines utilize centrifugal force for separating one type of material from another type, for example, solids from liquids. In general, a centrifugal utilizes a rapidly rotating perforated cage or basket into which the material to be separated is placed. Such machines may be of the batch process type or the continuous type. In one form of continuous centrifugals, an inverted conical shaped basket is rapidly rotated so that the liquid is forced through a pervious membrane mounted internally of the conical basket and the partially dry solids are gradually forced up along the basket and out over the top into a separate container.

Centrifugal machines utilize centrifugal force for the separation of materials and the rotating baskets must be strong enough to accommodate the substantial pressures involved. As pointed out above, a pervious membrane is utilized to separate liquids from solids, and such pervious membranes are not sufficiently strong to be self supporting under the operating pressures of the centrifugal machine. Therefore, common practice heretofore has been to provide a basket made of heavy gauge, perforated metal plate formed in the shape of a conical basket for supporting a pervious membrane internally of the basket. The pervious membrane may be wire screen, cloth or the like. In some industries, the practice requires the use of expensive materials for at least the exposed parts of the centrifugal and particularly the basket and material contacting parts, for example, stainless steel for the sugar industry. The forming of the baskets from metal plate as heretofore encountered in the art results in an expensive operation with a substantial waste of material.

According to the present invention, we have provided a centrifugal basket of high strength which is easily formed of flat wire without a waste of material. The invention provides a basket of a continuous spiral winding of flat wire supported on radial supports, with the wire spaced to support a pervious membrane as the screening media. The invention, also, provides a machine for forming the wire into a conical shape and a jig for welding the wire to the reinforcing members for supporting them in position.

Included among the objects and advantages of the present invention is a centrifugal basket of simplified design and increased strength which is formed of a spiral of continuous flat wire wound into conical form and arranged to support a perforate membrane internally thereof.

Another object of the invention is to provide a centrifugal basket formed of a continuous spiral of wire, with the loops arranged to be spaced at predetermined intervals to suit the requirements of the particular centrifugal.

Another object of the invention is to provide apparatus and method of forming a centrifugal basket wall from a continuous band of wire.

A further object of the invention is to provide a jig for forming a conical centrifugal basket which is composed of fixedly secured components inclusive of a continuous spirally wound length of wire.

A still further object of the invention is to provide a centrifugal basket of a novel design which permits a simple and fast fabrication from a continuous length of a spirally conically wound wire and a plurality of external reinforcing ribs arranged to be welded to the outside of the wire.

These and other objects and advantages of the invention may be readily ascertained by referring to the following description and appended illustrations in which:

FIG. 7 is a partial schematic view of a jig for use in fabricating a centrifugal basket from a conically shaped spirally wound helix of continuous wire;

Figure 1:
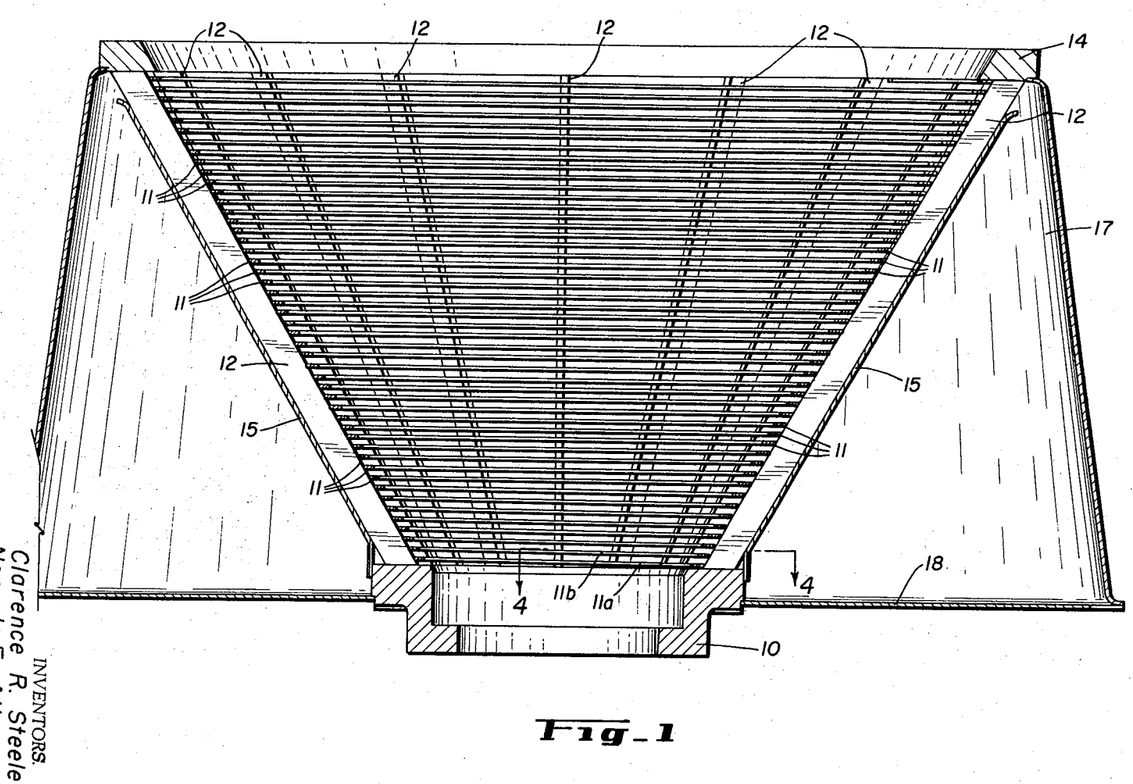
FIG. 1 is a side elevational view, in section, of one form of a centrifugal basket arranged with a shroud for a particular type of centrifugal.
Figure 2:
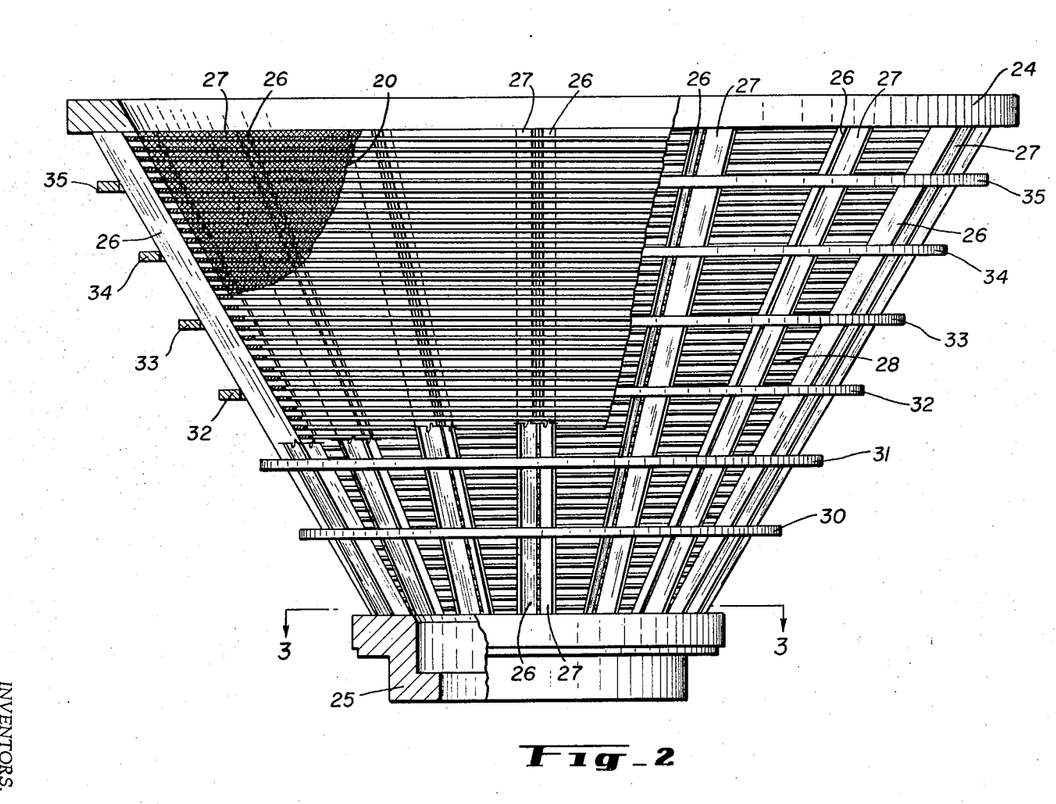
FIG. 2 is a side elevational view, partially cut away, of a centrifugal basket, the supporting structure of which is slightly modified from that of FIG. 1.

Two general types of centrifugal baskets are shown in FIGS. 1 and 2, a shrouded basket in FIG. 1 and an unshrouded basket in FIG. 2. Each of the baskets consists of a spiral of continuous wire in the shape of a conical member. The difference between the two is in the supporting members. With the shrouded type, a sheet or plate material encompasses the exterior of the basket secured to the brace members and in itself acts as bracing to produce the amount of support required for the basket. The shrouded type has an attached material separating partition, while the unshrouded type requires similar arrangement in the centrifugal housing.

Figures 3, 4:
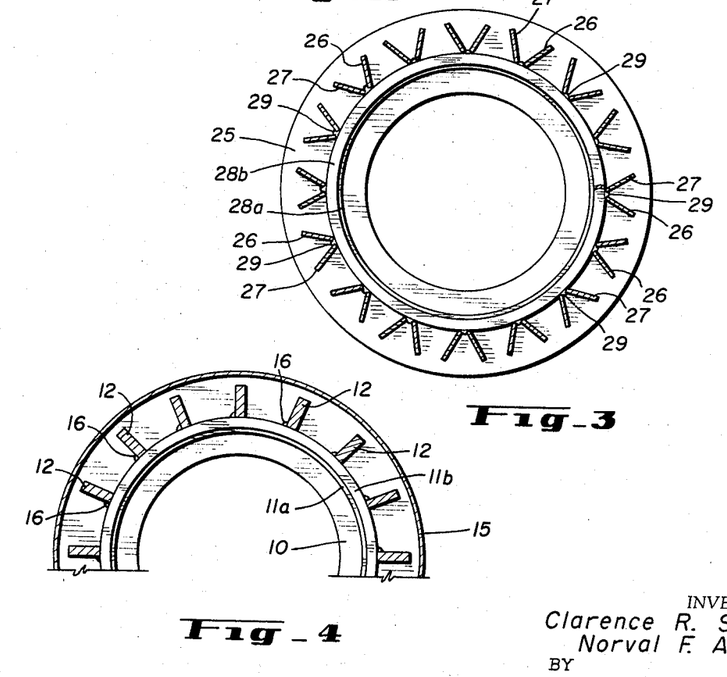
FIG. 3 is a sectional view of the device of FIG. 2 taken along section line 3—3.
FIG. 4 is a partial section of a portion of the device of FIG. 1 taken along section line 4—4.

The basket of FIG. 1 includes a bottom ring 10 arranged to support a continuous spirally wound flat wire basket 11 which is supported by a plurality of ribs 12 spacedly mounted around the conically shaped basket. The wire 11 is a continuous length of stainless steel wire and it is welded to the ribs and to the ring 10. A top ring 14 is likewise secured to the ribs 12 and to the wire 11. A plate conical partition 15 encompasses the ribs 12 and is secured thereto and to the ring 10 as by welding or the like. An outer shroud 17 is secured to the top ring and to a base plate 18 to form a shrouded member for collection of liquid passing through the basket over partition 15. Each turn of wire is welded to the ribs 12 holding the wire in place and each rib is welded to the bottom ring as well as the top ring forming a rigid structure. The side of the conical basket slopes outwardly from the vertical at about a 30° angle which is the angle necessary for the operation of one particular type of machine. As shown in FIG. 4, which is a partial section of the lower portion of the basket, the inner cone assembly 15 may be secured to the bottom ring 10, and a short skirt portion around the bottom ring flares from the ribs to bottom 10. Above the skirt, however, the ribs are secured to the inner cone assembly. The first turn 11a of the wire may be secured into the base ring or annulus, and it is welded to each of the ribs 12. The second turn 11b is also welded to each of the ribs at 16. Each turn is, likewise, welded to the ribs from the bottom to the top. The welds securely hold the wire to the ribs in a rigid structure. After the ribs are fastened to the spiraled wire, the inner shroud is secured to the assembly. Then the outer shroud 17 and the disc 18 are secured to the assembly.

The modified basket shown in FIGS. 2 and 3 includes a bottom ring 25 and a top ring 24 secured together by a plurality of double ribs 26 and 27 in a V shape. A flat wire spiral cone shaped basket wall 28 is secured internally of the structure and is welded to each of the ribs apex of the double ribs. The ribs are held together by a series of rings 30 through 35. Each turn of the spiral wire of the basket liner is welded to each of the V-shaped members forming a rigid basket structure. As shown in FIG. 3 the bottom ring 25 is secured to a series of V-shaped ribs 26 and 27 which are fastened thereto and extend upwardly to the top plate. Each spiral of the spirally wrapped wire is welded at 29 to both of the V-shaped ribs, the weld being at the apex of the V holding the ribs to the wire. In like manner, each of the outer edges of the ribs is welded to each of the rings.

In each case the wire is a round edged flat wire preferably of oblong section which is curved on the width and and is spirally wound in such a manner as to form the conical shape. A jig is provided for supporting the wire in position for welding, which is set forth in detail below. After forming and welding the parts together, the top and bottom rings may be drilled and tapped where necessary for attachment to a centrifugal or for the attachment of shield rings and the like on the top ring.

Figure 12:
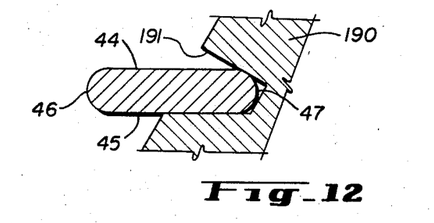
FIG. 12 is an enlarged cross sectional detail of the flat wire used for forming a centrifugal basket and a wire support member according to the invention.

The wire for making the basket is shown in cross section in FIG. 12, and it is generally a flat wire having a flat upper side 44 and a lower side 45 with two rounded ends 46 and 47. The wire is ade of stainless steel for certain applications, and in one application the annealed stainless steel is 5/16 inch wide by 0.080 inch thick with round edges. The wire is normally coiled on rolls flatwise for convenience. One size of basket has the wire wound in conical shape of about 8¼ inches for the bottom and about 28 inches at the top and has about forty loops of the wire spaced about .33 inch apart. Such a basket requires about 227 feet of the wire.

Figure 5:
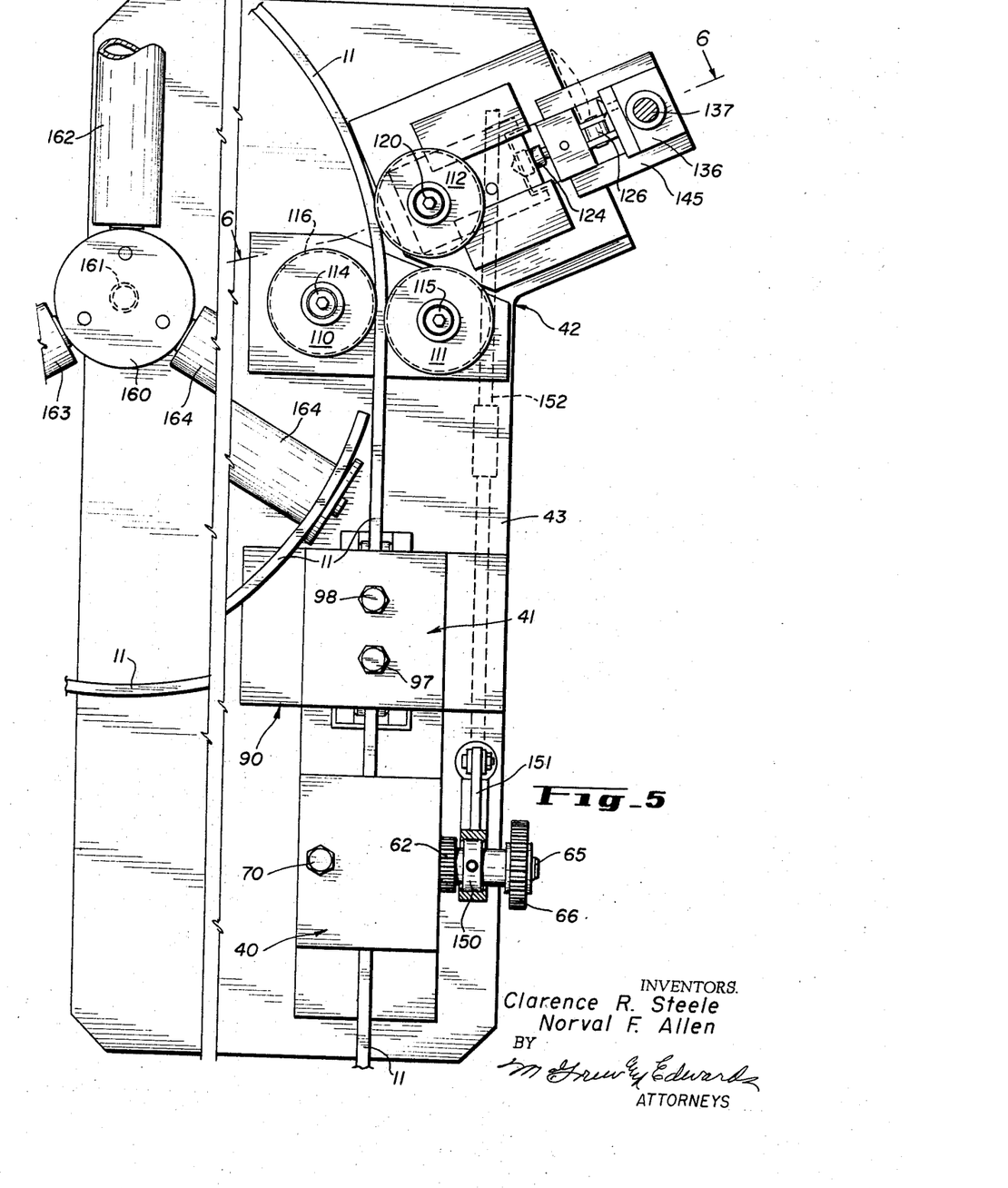
FIG. 5 is a top plan view of a wire forming device for the centrifugal basket according to the invention.

For preparing the wire into a basket form the wire must first of all be straightened from curves acquired while in the roll. The wire is bent into a straight member and then curved sideways in increasing diameter coils to form a conical member. As shown in FIG. 5 a length of wire 11 issues from a roll (not shown) into a drive member 40, through a straightening member shown in general by numeral 41, and subsequently into the coiling mechanism shown in general by numeral 42.

Figure 14:
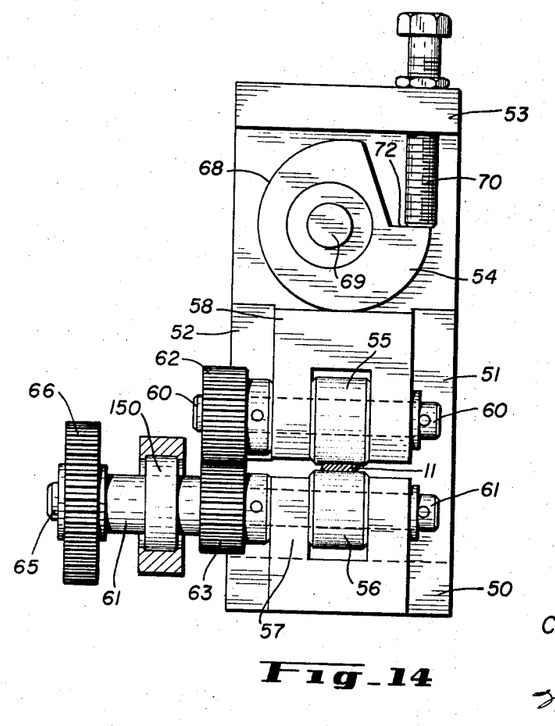
FIG. 14 is a front elevation of a wire device mechanism for forcing wire through the forming mechanism.

The driving roll assembly 40 is shown in FIG. 14 wherein a framework includes a base 50 and upright sides 51 and 52. A top support member 53 supports a cam 54. A pair of rollers 55 and 56 is journaled in blocks 57 and 58 on shafts 60 and 61, respectively. The two shafts are rotated together for the driving operation by means of gearing 62 and 63 on shafts 60 and 61, respectively. The shaft 61 has an extension member 65 on which is mounted a gear 66 for connection to drive means, not shown, turning the shafts and the rollers 55 and 56. The blocks 57 and 58 are arranged to move vertically so that the rollers carried therein may be moved toward and away from one another. The cam 54 includes a cam surface 68 and the cam is mounted on a shaft 69. Rotating the cam clockwise causes it to press the block 58 toward the block 57. An adjusting bolt 70 mounted in the head 53 is arranged to press against cam surface 72 rotating the cam so as to force it against the block 58 to provide pressure on the wire 11 carried therein. The rollers grip the wire and rotating the rollers drives the wire toward the straightening blocks.

Figure 13:
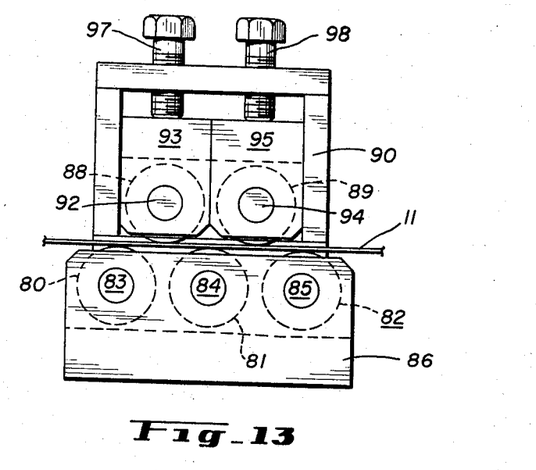
FIG. 13 is a side elevation of a wire straightening device for use in the wire forming apparatus.

The wire, after leaving the drive rollers 40, shown in FIG. 5, is pushed through straightening rollers, shown in general by numeral 41. The straightening rollers include, as shown in FIG. 13, a series of three lower rollers 80, 81, and 82 mounted on shafts 83, 84 and 85, respectively, mounted in a lower frame 86. A pair of upper rollers 88 and 89 is mounted in upper frame 90 in the bight between the lower rollers. The roller 88 is mounted on shaft 92 which is journaled in a reciprocal block 93, and the roller 89 is journaled on a shaft 94 which is mounted in a block 95. The blocks 93 and 95 are controlled, respectively, by set screws 97 and 98 which control the pressure of the rollers 88 and 89 on the ribbon 11 between the lower and upper rollers. By adjusting the pressure on one or the other of the upper rollers, the partially curved wire may be straightened for passing through the spiral helix former.

Figure 6:
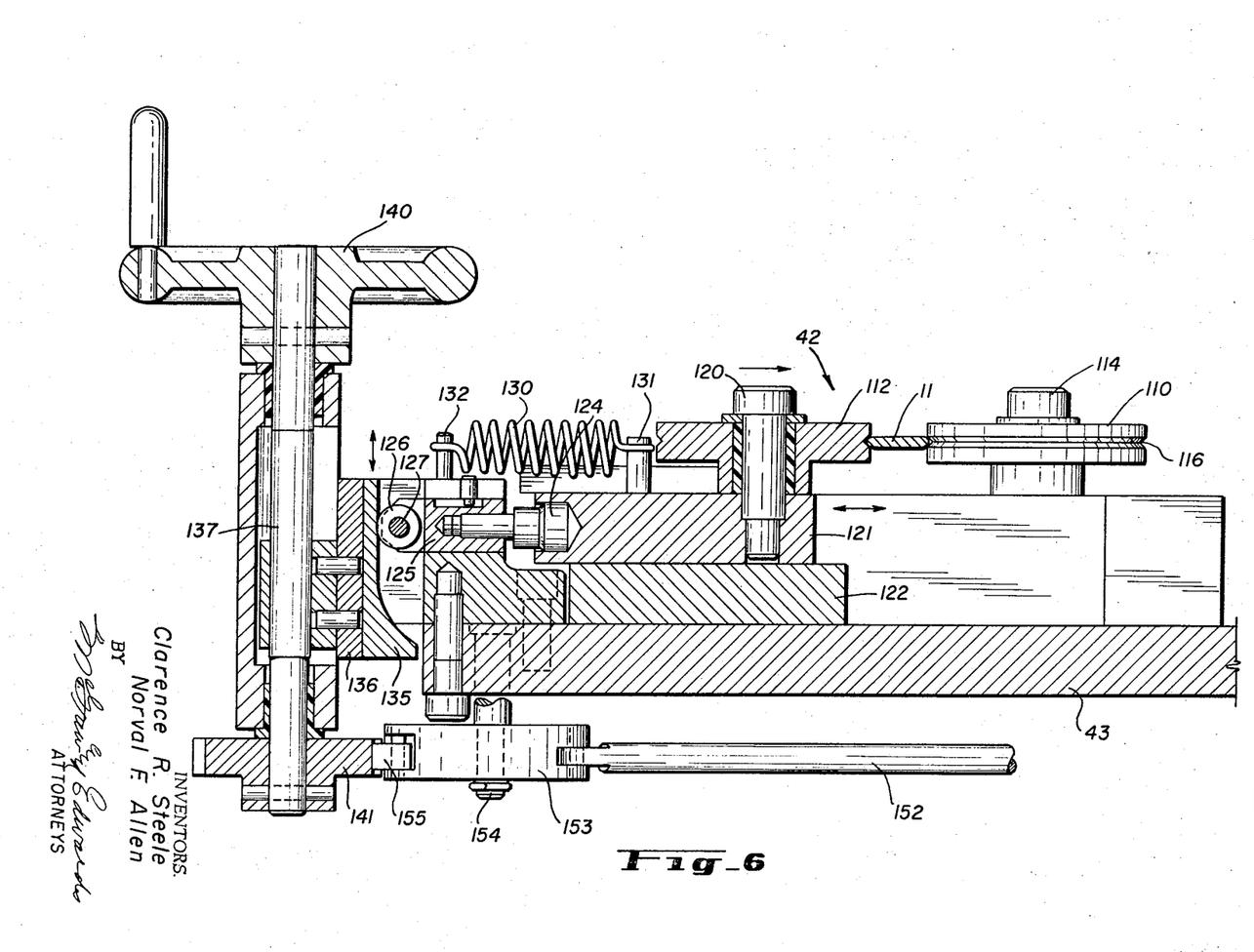
FIG. 6 is a cross sectional view of a control mechanism for the wire forming device of FIG. 5.
Figure 8:
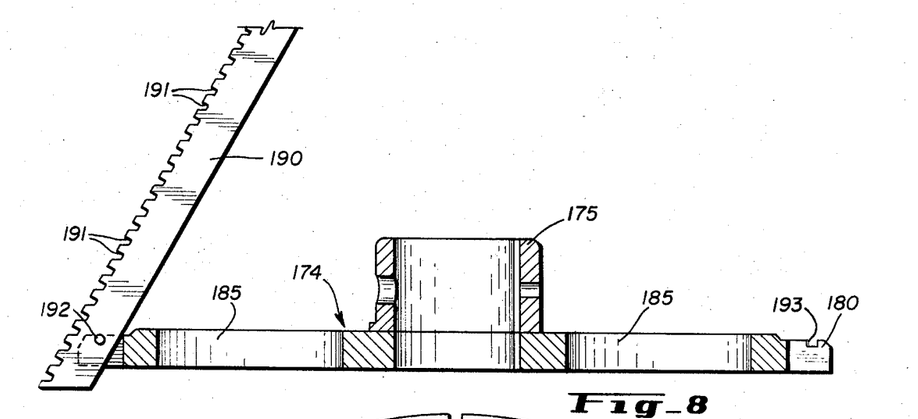
FIG. 8 is a partial, detailed view of a portion of the jig showing relation of the members of the jig for supporting the spirally wound wire in position for welding.
Figure 9:
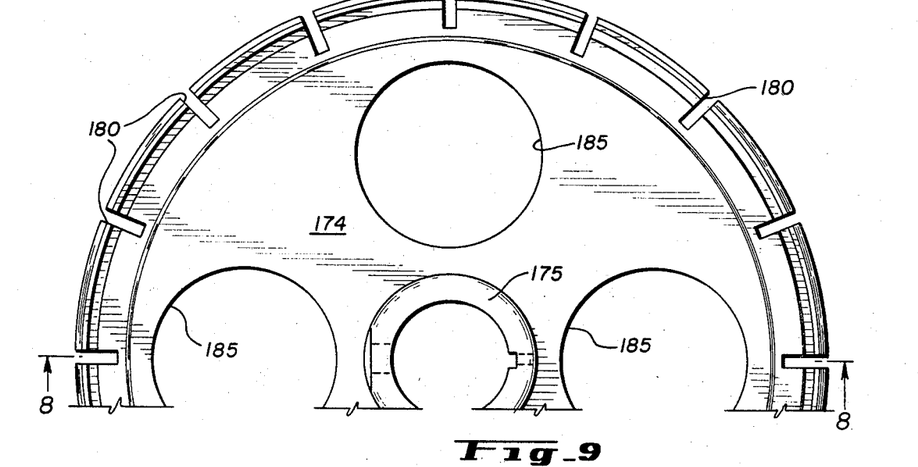
FIG. 9 is a portion of a detailed plan view of a bottom flange of the jig according to the invention.
Figure 10:
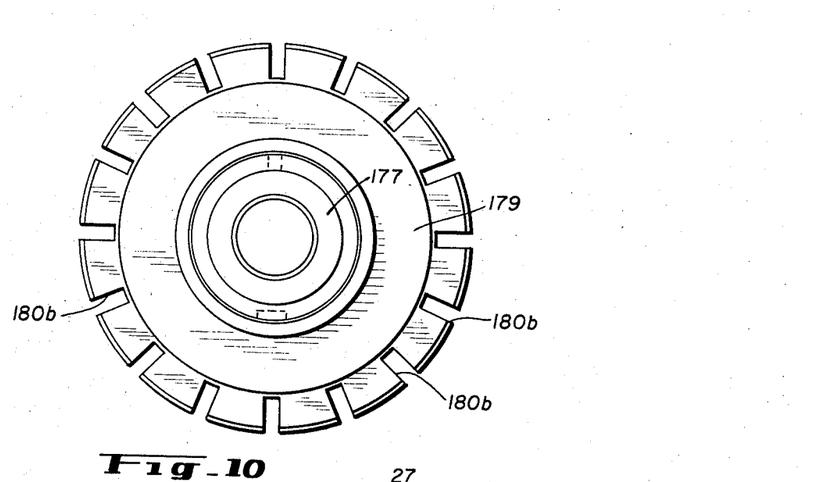
FIG. 10 is a top plan view of a middle flange of the jig according to the invention.

The helix-forming rollers shown in general by 42 in FIGS. 5 and 6 include three rollers 110, 111 and 112. The rollers 110 and 111 are essentially fixed relative to one another. Roller 112 may be at a slightly higher elevation than the other two rollers to space the formed loops of wire. The roller 110 is journaled on shaft 114 and the roller 111 is journaled on shaft 115 and rotate as wire 11 is driven between them. The shafts are mounted on base 43. All of the rollers are grooved and have the configuration of that shown in FIG. 6 for roller 110 wherein a groove 116 extends peripherally midway of the width of the roller therearound. The rollers 110 and 111 are fixedly mounted on the base 43 but may be adjustable to accommodate the particular size of wire being drawn through them. The roller 112 is an adjustable roller which is arranged to move generally toward and away from the rollers 110 and 111 at an angle to the bight between them. The helical wire basket wall is formed by pushing the wire 11 through the spiraling rollers 110, 111 and 112 and progressively forcing the roller 112 toward the roller 111 to decrease the radius of the arc of the curved wire being forced therethrough. This progressively forms smaller turns forming the conical shaped wire basket.

The roller 112 is journaled on a shaft 120 which is mounted in a reciprocal block 121 which is arranged to move as indicated by the arrow, FIG. 6. The block 121 slides on support 122 which is mounted on base 43. The block 121 is secured to one end of connecting rod 124 and the other end of the rod is secured to a cam follower support 125. A cam follower 126 is journaled on shaft 127 mounted on the cam follower support 125. A spring 130 mounted at one end on a post 131 which is fixedly secured to the block 121 and by the other end to post 132 which is fixedly mounted in the frame secured to the table to bias the block 121 toward the cam surface. A cam 135 is mounted on a vertically movable block 136 which is threadedly mounted on a threaded shaft 137. At the upper end of the shaft a hand wheel 140 provides means for manually setting the cam, and at the other end by a gear or cog 141. Obviously, rotation of the shaft 137 moves the cam upwardly and downwardly since the block 136 is held securely against rotation in the frame 145.

An eccentric 150 mounted on the shaft 61, FIG. 5, drives a push rod 151 which is connected to push rod extension 152. The push rod extension is connected with a pivoted lever arm 153 pivoted on pivot 154. A pawl 155 mounted on the other end of the pivot arm 153 contacts the cog 141 for moving the same and periodically rotating the shaft 137. The gearing and the eccentric are arranged so that the cam 135 is moved upwardly to move the cam follower from an outer position to an inner position along the cam surface during the forming of the helix. The cam travels the length of the cam surface during the time the required length of the wire passes through the forming rollers.

A wire support assembly is provided for the spiraled wire coming from the forming rollers 110, 111 and 112, and this includes a central disc 160 mounted on a shaft 161 which is mounted on the frame 43 in position to support the wire coming from the forming rollers mounted thereon. Rotatable extending tubular arms 162, 163 and 164 are spacedly mounted on the disc 160 and are arranged to support the wire coming from the forming rollers.

The wire coming from the forming rollers is a helical shaped coil of wire which is of conical configuration, with the approximate shape of the desired basket. Since the loops are free they are obviously not in exact relationship as necessary for forming the final basket. A simplified welding fixture is provided for holding the wire in position for welding the side supports thereon for holding the top and bottom plates and for holding the support rings where necessary. The welding fixture is shown in FIGS. 7–11. The fixture includes a base member 170 supported on a central upright shaft 171. A basket top ring 14 rests on the base 170 for the assembly, and a support ring 174 is mounted on the shaft 171 above the ring 14. A collar 175 provides an adjustable mounting on the upright shaft 171 and it is secured in place by set screws 176. The plate 174 is illustrated in detail in FIGS. 8 and 9 which includes a plurality of notches 180 spacedly cut in the rim of the plate. This plate is arranged to hold wire locating bars to which the ribs are welded. A plurality of openings 185 are formed in the disc to provide access to the holding screws 176 for releasing the jig when the basket is completed. A center bar support 178 with openings 185a is, likewise, secured on the upright shaft 171. It is of slightly smaller dimension than the base plate 174 and is arranged to support the center portion of the wire locating bars in notches 180a which are in register with the notches 180 on the lower plate 174. It is provided with a boss 175a and holding set screws 176a. A top plate 179 with a hub is mounted below a block 187 and both mounted near the top of the upright shaft, FIG. 7, for supporting the upper ends of the wire locating bars. The plate 179 is provided with matching bar locating notches 180b. The top 184 of the block fits over a reduced portion 182 of the upright shaft 171 and is arranged with cap 186 to secure bottom ring 10 in place. A nut 183 holds the assembly rigidly on the shaft.

A plurality of wire locating bars 190 are spacedly located around the welding fixture and are mounted in the slots 180. A dowel 192 mounted on the bar fits in a groove 193 to hold the bar in position. In one size sixteen such bars are required to securely hold the wire for welding to support ribs. The bars 190 are provided with a plurality of notches 191 extending up from the bottom to the top along one side. The notches are spaced apart on each bar so as to correctly space the wire in each loop in proper position. Thus the lowermost notch on each bar is spaced slightly higher than the notch on the next neighbor, providing in effect a spiral of notches. A typical arrangement of the wire and wire supporting notches is shown in FIG. 12, wherein the notches 191 have a flat lower side to support the flat wire thereon and an upper side which permits easy removal when the jig is disassembled from the formed basket. As explained above, equivalent notches from bar to bar must be upwardly stepped so as to provide for the continuous winding of the helix. In one size, the step up from bar to bar is on the order of 0.0205 inch which, in one complete revolution around the sixteen bars, provides one full space between the notches on the starting bar, the space being the distance between each loop of the finished basket. The welding fixture is assembled as shown, and the spiraled wire is placed over the fixture. The loops are then placed in their correct notches. The wire is wound slightly smaller than the final dimension of the basket so that the wire fits tightly in the notches of the wire spacer bars 190.

Figures 1, 11:
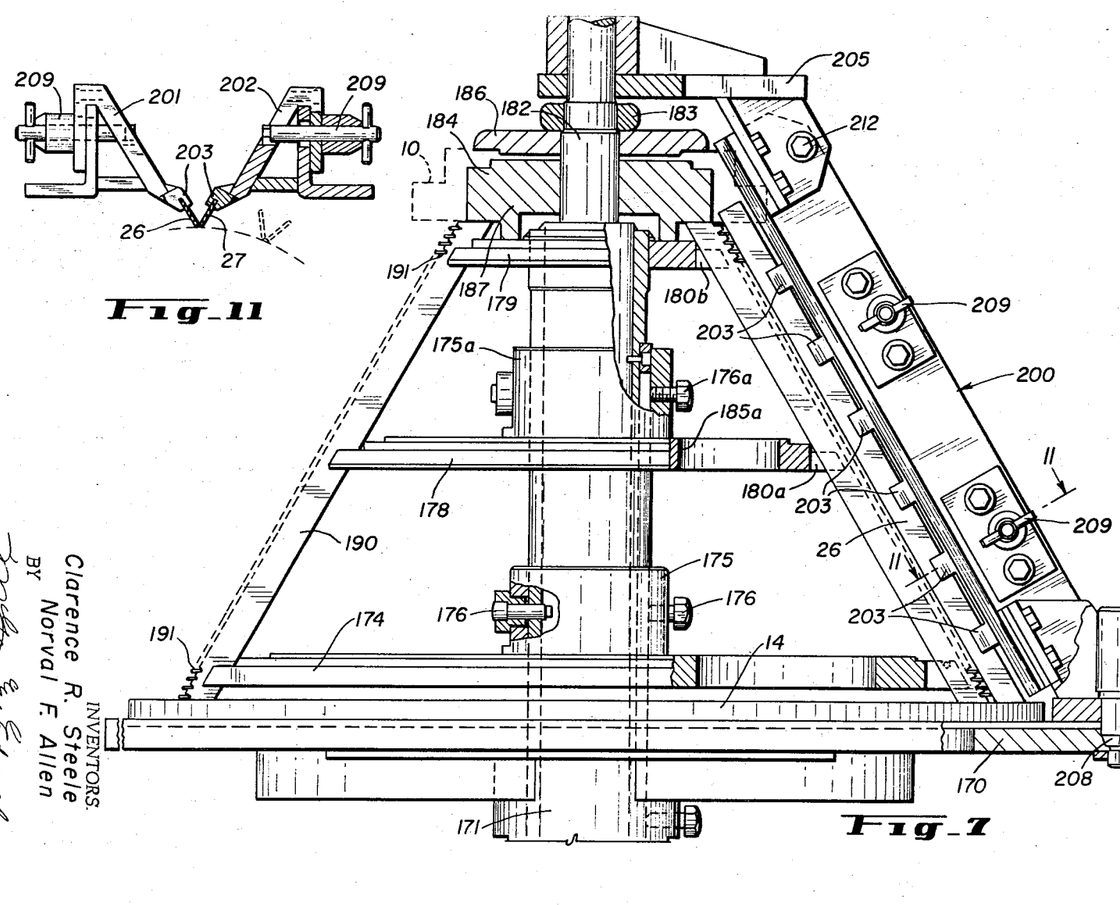
FIG. 11 is a cross sectional detailed enlargement of the jig fixture illustrating the position of the centrifugal basket rib members in position for welding onto the basket of continuous wire.

A rib supporting fixture, shown in FIG. 7, comprises a V-shaped framework 200, shown in cross-section in FIG. 11, which includes frame parts 201 and 202 for holding the V-shaped ribs of the non-shrouded basket. The rib holders include a slotted rib holder end 203 on each end of the frame parts 201 and 202, for holding a rib against the wire 11 which is secured in the frame and held in the wire locating bars. The framework 201 and 202 are mounted on an upper bearing assembly 205 which is rotatably mounted on the upper end of the shaft 171. The lower end is arranged with a locking dowel 207 for temporarily seating in a plurality of holes 208 which are spacedly mounted around the base rim 170 and support the ribs in position for welding. Adjusting set screws 209 provide means for adjusting the spacing of the ribs 26 and 27 which are held in the ends 202 and 203. The adjusting screws insure that the ribs form a general V-shape with their V ends spaced slightly apart and pressed against the wire. The rib holder is secured to the bearing assembly 205 by means of a roller pin 212 which permits the rib holder to pivot upwardly for the insertion of the ribs into the holders without removal of the holders from the fixture. This, also, permits the holder to be withdrawn from the ribs which have been welded to the wire. With the wire in place on the wire spacer bars, a pair of ribs 26 and 27, FIG. 11, is placed in the rib supports and moved against the outside edge of the wire and the rib holders are secured in position by the pin 207. In this position, shown in FIG. 11, the ribs may then be welded to the wire as by spot welding both sides of the V onto the adjacent wire, at each loop along the outside of the basket.

The rib is welded to the top ring 14 and to the bottom ring 10; the rib holder of welding jig is then moved to the next position for welding the next set of ribs to the outside of the basket. This procedure is continued around the periphery of the basket until all the ribs are in place and the ribs are welded to the top and bottom rings. Where a shrouded basket is to be prepared, the double rib holder may be replaced by a single rib holder which supports a single rib in upright position perpendicular to the periphery of the wire so that the rib may be welded to each wire along its length.

On completing the basket on the fixture, the basket and fixture including the shaft are turned right side up and the fixture disassembled. The fixture is easily disassembled by loosening the set screws on the bottom plate 174 which is then removed. The middle bar holder is removed and the bars are then removed from the wire. The shaft and holding members may then be removed. With the shrouded basket, the shrouds are secured in place. Either basket is then ready for assembly with the centrifuge.

Figure 15:
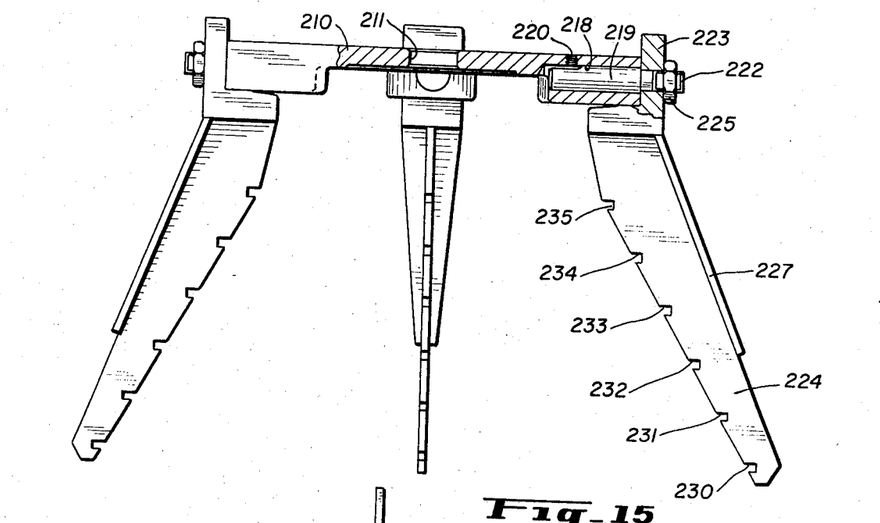
FIG. 15 is a side elevational view of a ring locating fixture for use with the welding jig according to the invention.
Figure 16:
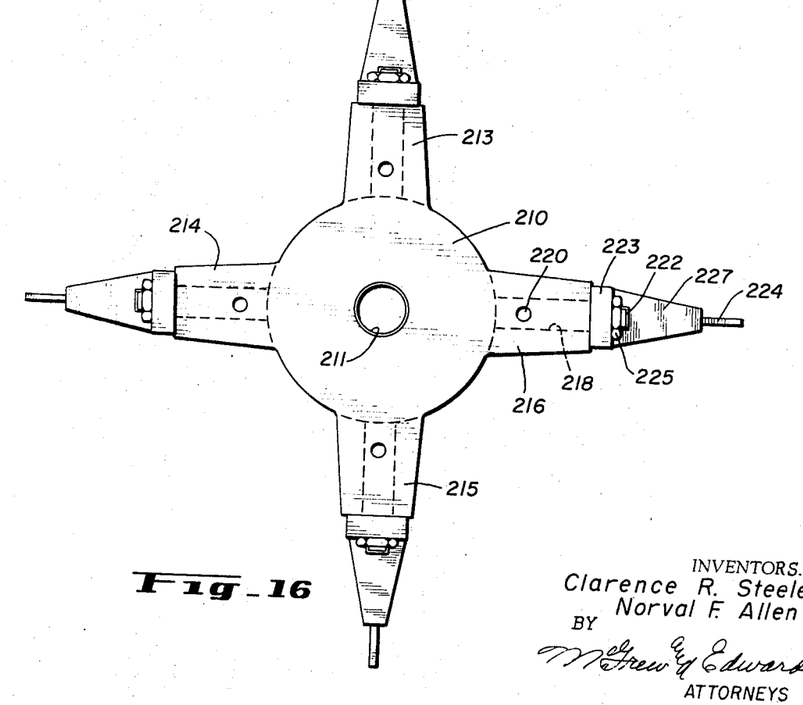
FIG. 16 is a top plan of the ring retainer of FIG. 15 showing a single ring locator bar mounted on a support.

The unshrouded basket has supporting rings 30-35 secured to the exterior of the ribs. To support the rings in position for welding, a fixture shown in FIGS. 15 and 16 is provided. This ring holding fixture is arranged to mount on the top of the shaft in place of the rib holding fixture, which is, of course, withdrawn when all the ribs are welded in place. The ring fixture includes a plate 210 having an aperture 211 centrally therein arranged to telescope over the top of the shaft 171 above the partially completed basket. The plate has four equally spaced arms 213, 214, 215 and 216 extending radially therefrom. Each arm has a bore 218 described only for one since all are similar, accommodating a pin 219 which is held by a set screw (not shown) threadedly mounted in bore 220. The pin has a threaded end 222 over which the upper end 223 of a ring support bar 224 is telescoped. The bar may be firmly held by a nut 225 threadedly mounted on the pin. The bars for supporting the rings include notches 230-235 into which the rings are placed for holding, the width of the rings being about the size of the notches for firmly holding them during the welding of the rings onto the ribs. A brace plate 227 is welded in position on the bar 224 to provide support.

The ring holder may be used by initially placing all the rings in the notches with several of the bars loose on the plate. When the rings are in place the nuts are screwed down to tighten the bars in position, holding the rings. The assembly is then placed on the shaft and it drops down onto the ribs with the rings firmly held against them. Each ring is then welded to the plurality of ribs on the basket. When all the rings are welded in place, the nuts holding the bars are loosened or removed, and the bars and plate dismantled and removed from the fixture. The basket is then removed as explained above.

This procedure produces centrifugal baskets without a waste of material and without heavy plate forming machines. The baskets are, further, produced in a remarkably short time, ready for assembly with the centrifugal and for assembly of the pervious membrane as the screening media 20 mounted internally of the basket in covering relation thereto. A fragment of the screening media 20 which covers the inner surface of the wire wound basket is shown in FIG. 2 for purposes of illustration. The shape of the basket may be changed to meet particular requirements, thus requiring configuration changes in the welding fixture members. Vertically sided baskets may be made of the wire, using the method described herein and the equipment, without the need for moving the movable helical roller, thus forming a helix of the wire of uniform diameter loops. Such helix is then welded to vertical ribs and to top and bottom plates for finishing.

While the invention has been illustrated by reference to specific devices, there is no intent to limit the spirit or scope of the invention to the precise details so set forth except as defined in the following claims.

We claim:
1. A basket assembly for centrifugal separators comprising spaced wider and narrower annular end members, a plurality of ribs disposed in circumferentially spaced intervals between the end members, each rib being fixedly connected at each of its ends to the end members, and a flat wire of uniform oblong section wound in a coil formed of a series of helical loops with each loop having outer sides in contacting relation with inner surfaces of said ribs throughout its circumferential extent, said coil of wire progressing continuously from a narrower loop at one end portion to a wider loop at its opposite end portion, the end portion of the narrower loop being fixedly connected to a contacted surface of said narrower end member and the end portion of the wider loop being fixedly connected to a contacted surface of the wider end member, each said loop being fixedly connected at each point of contact along its exterior surface to an inner surface of each of said ribs and each said connected loop being held by its fixed connection with the ribs in equidistant spaced relationship with adjoining loops and the entire length of wire held as an integral component of the support structure of the basket assembly, a plurality of spaced support rings disposed in contacting relation on the exterior of said ribs at intervals between said end members, each said ring being fixedly connected to each of said ribs, and a screening media mounted on the inner surface of said helical coil in a supported and covering relation thereto.

2. A basket assembly as set forth in claim 1 wherein the ratio of spacing adjoining each loop to the thickness of each loop is substantially greater than one to one.

3. A basket assembly as set forth in claim 1 wherein the ratio of spacing adjoining each loop to the thickness of each loop is at least three to one.

4. A basket assembly for centrifugal separators comprising spaced wider and narrower annular end members, a plurality of ribs interconnected at circumferentially spaced intervals between the end members, each rib being welded at each of its ends to the end members, and a flat wire of uniform section having a greater width than thickness with its wider sides being parallel and wound in a coil formed of a series of helical loops, each loop having an outer narrower side in contacting relation with inner surfaces of said ribs throughout its circumferential extent, said coil of wire progressing continuously from a narrower loop at one end portion to a wider loop at its opposite end portion, the end portion of the narrower loop being welded along a contacted surface of said narrower end member and the end portion of the wider loop being welded along a contacted surface of the wider end member, each said loop being spot welded along each point of contact at only one spot adjoining its exterior surface and an inner surface of each of said ribs, and each said welded loop being secured by the welds in equidistant spaced relationship with adjoining loops, and the entire length of wire held as an integral component of the support structure of the basket assembly, a plurality of spaced support rings disposed in contacting relation on the exterior of said ribs at intervals between said end members, each said ring being fixedly connected to each of said ribs, and a screening media mounted on the inner surface of said helical coil in a supported and covering relation thereto.

5. A basket assembly as set forth in claim 4 wherein said ribs are V-shaped with their apexes being welded at each point of contact to said coil of wire.

6. A method of forming a basket assembly for centrifugal separators which comprises forming a length of wire of oblong section in a coil formed by a series of continuous helical loops, forming an exterior support for interfitting with the series of wire loops, including wider and narrower annular end members, a plurality of circumferentially spaced ribs disposed to interconnect said end members in a rigid assembly, and a fixed connection between each annular member and an end portion of each of the plurality of ribs thereby maintaining the assembly rigid, mounting the helical coil on a support means having a plurality of vertically and circumferentially spaced portions for seating the wire loops so as to establish a preselected, uniform spacing between successive loops of the coil along its lengthwise extent, mounting the coil of wire having said established uniform spacing within the rigid support assembly, mounting a plurality of spaced support rings on the exterior of said ribs at intervals between the annular end members, and then fixedly connecting each contacting surface of a narrow side of the wire at each point of contact with said ribs while maintaining the established spacing between said loops by such connection, fixedly connecting each of said rings to each of said ribs, fixedly connecting the ends of the wire to the adjoining wider and narrower end members so as to secure the entire length of wire as an intergral component of the support structure of the basket assembly, and mounting a screening media internally of the helical coil in a supported and covering relation thereto.

7. A method as set forth in claim 6, wherein said fixed connections are formed by a progressive welding adjoining each of said contacting surfaces by a single spot weld.

8. In the manufacture of a basket assembly for centrifugal separators having wider and narrower end members interconnected by a plurality of circumferentially spaced ribs to form an outer support for an internal perforate support arranged for directly engaging a screening media, the steps of shaping a length of wire of oblong section in a coil formed by a series of helical loops progressively from a smaller loop at one end to a larger loop at the other end to form the internal support, mounting the helical coil on a support means having a plurality of vertically and circumferentially spaced portions for seating the wire loops so as to establish a preselected uniform spacing between successive loops of the coil along its lengthwise extent, positioning the wider and narrower end members in contact with end portions of the larger and smaller loops respectively and end portions of the ribs in contact with the end members and inner surfaces of the ribs in contact with outer side surfaces of each of said loops, mounting a plurality of spaced support rings on the exterior of said ribs at intervals between the annular end members, and securing said end members to the ribs at the points of contact to form a rigid outer support, securing each of said rings to each of said ribs, and securing said loops to said rings and ribs at each of said contact surfaces to maintain the entire length of wire as an intergral part of said outer support having the established spacing between said loops, and mounting a screening media internally of the helical coil in a supported and covering relation thereto.

9. A method of forming a basket assembly for centrifugal separators which comprises forming a length of wire having sides of greater width than thickness with the wider sides being parallel in a coil formed by a series of continuous helical loops, forming an exterior support for interfitting with the series of wire loops, including wider and narrower annular end members, a plurality of circumferentially spaced ribs disposed to interconnect said end members in a rigid assembly, and a fixed connection between each annular member and an end portion of each of the plurality of ribs thereby maintaining the assembly rigid, mounting the helical coil on a jig fixture inclusive of a plurality of circumferentially spaced bars having vertically spaced recessed portions shaped for receiving a narrower outer side of the wire for seating the wire loops so as to establish a preselected, uniform spacing between successive loops of the coil along its lengthwise extent, mounting the coil of wire having said established uniform spacing within the rigid support assembly, mounting a plurality of spaced support rings on the exterior of said ribs at intervals between the annular end members and then fixedly connecting each contacting surface of a narrow side of the wire at each point of contact with said ribs while maintaining the established spacing between said loops by such connection, fixedly connecting each of said rings to each of said ribs, fixedly connecting the ends of the wire to the adjoining wider and narrower end members so as to secure the entire length of wire as an intergral component of the support structure of the basket assembly, and mounting a screening media internally of the helical coil in a supported and covering relation thereto.

10. A method of forming a basket assembly for centrifugal separators which comprises forming a length of wire having sides of greater width than thickness with the wider sides being parallel in a coil formed by a series of continuous helical loops by bending the wire along its width by applying forces to one of its narrower sides, forming an exterior support for interfitting with the series of wire loops, including wider and narrower annular end members, a plurality of circumferentially spaced ribs disposed to interconnect said end members in a rigid assembly, and a fixed connection between each annular member and an end portion of each of the plurality of ribs thereby maintaining the assembly rigid, mounting the helical coil on a support means having a plurality of vertically and circumferentially spaced portions for seating the wire loops so as to establish a preselected, uniform spacing between successive loops of the coil along its lengthwise extent, mounting the coil of wire having said established uniform spacing within the rigid support assembly, mounting a plurality of spaced support rings on the exterior of said ribs at intervals between the annualr end members, and then fixedly connecting each contacting surface of a narrower side of the wire at each point of contact with said ribs while maintaining the established spacing between said loops by such connection, fixedly connecting each of said rings to each of said ribs, fixedly connecting the ends of the wire to the adjoining wider and narrower end members so as to secure the entire length of wire as an intergral component of the support structure of the basket assembly, and mounting a screening media internally of the helical coil in a supported and covering relation thereto.

References Cited

UNITED STATES PATENTS

| 61,541 | 1/1867 | Hubbe | 210—380 |
| 1,879,355 | 9/1932 | Liddell | 210—497.1 X |
| 2,042,537 | 6/1936 | Liddell | 210—497.1 |
| 2,321,207 | 6/1943 | Howe | 210—380 |
| 3,050,190 | 8/1962 | Siepe | 210—380 |
| 3,136,721 | 6/1964 | Gooch | 210—380 X |

FOREIGN PATENTS 414,470  8/1934  Great Britain.

OTHER REFERENCES

German printed application 1,103,257, March 1961, Krolzik.

REUBEN FRIEDMAN, *Primary Examiner.*

J. L. DE CESARE, *Assistant Examiner.*

U.S. Cl. X.R.

29—163.5; 210—497.1